United States Patent [19]
Blank et al.

[11] 3,791,605
[45] Feb. 12, 1974

[54] ROTARY SPOOL FOR STORAGE OF CONVOLUTED PHOTOGRAPHIC FILM OR THE LIKE

[75] Inventors: Rudolf Blank, Cologne; Achim Kluczynski, Porz-Eil, both of Germany

[73] Assignee: Agfa-Gevaert Aktiengesellschaft, Leverkusen, Germany

[22] Filed: July 31, 1972

[21] Appl. No.: 276,535

[30] Foreign Application Priority Data
July 31, 1971  Germany.............................. 2138429

[52] U.S. Cl. ................................................. 242/74
[51] Int. Cl. ............................................ B65h 75/28
[58] Field of Search 242/74, 74.1, 74.2, 68.5, 125.1

[56] References Cited
UNITED STATES PATENTS
| 3,021,085 | 2/1962 | Freer | 242/74 |
| 2,552,222 | 5/1951 | Schulz | 242/74 |
| 3,645,473 | 2/1972 | Kitch | 242/74 |

*Primary Examiner*—John W. Huckert
*Assistant Examiner*—Edward J. McCarthy
*Attorney, Agent, or Firm*—Michael S. Striker

[57] ABSTRACT

A rotary spool for storage of convoluted elongated flexible strips (such as photographic film or magnetic tape) of the type having a relatively wide end portion followed by a relatively narrow neck portion has a substantially cylindrical core provided in its external surface with a circumferentially extending groove having a main section whose width slightly exceeds the width of a neck portion and a second section whose width slightly exceeds the width of an end portion. That part of the main section which is immediately adjacent to and communicates with the second groove section is flanked by a pair of ledges which overlie two internal recesses provided in the core and communicating with the part of the main section as well as with the second groove section at points located inwardly from the external surface of the core. When the end portion of a strip is inserted into the second groove section and is moved in a direction to enter the recesses of the core, the ledges hold the thus inserted end portion against separation from the spool. A projection in the part of the main groove section has a stop face which prevents the movement of end portion from the recesses back into the second groove section. The projection has a sloping surface located inwardly of the ledges and serving to guide the end portion from the second groove section into those ends of the recesses which are remote from the second groove section.

10 Claims, 3 Drawing Figures

PATENTED FEB 12 1974 3,791,605

ROTARY SPOOL FOR STORAGE OF CONVOLUTED PHOTOGRAPHIC FILM OR THE LIKE

BACKGROUND OF THE INVENTION

The present invention relates to improvements in spools or reels for storage of convoluted strip-shaped material, such as photographic roll film, magnetic tape or the like. More particularly, the invention relates to improvements in spools or reels of the type wherein the core is provided with means for separably or permanently retaining the specifically configured leader of a strip of photographic film or the like.

It is already known to provide the leader of a photographic film or magnetic tape with a relatively wide end portion and a relatively narrow second or neck portion which is located immediately behind the end portion, i.e., between such end portion and the main portion of a film or tape. It is also known to store such types of film or tape on spools or reels wherein the core is provided with a circumferentially extending groove having a width slightly or substantially less than the width of the neck protion and including a relatively wide section which can receive the end portion of a strip. A portion of the groove is flanked by two ribs. Reference may be had to German Patent No. 1,101,947. The distance between the ribs is less than the width of the neck portion of a strip. Consequently, when the relatively wide end portion of a strip is to be introduced into the wide section of such groove, the neck portion of the strip must be forced into the space between the ribs which are provided with inclined faces to guide the neck portion into the space therebetween. The end portion of the strip then abuts against the ribs and the neck portion is frictionally held between the ribs to thus prevent unintentional separation of the leader from the spool.

A drawback of the just described spool is that the attachment of the leader of a film, tape or analogous strip material is a time-consuming operation and also that the retention of the leader is not sufficiently reliable. Another drawback of such spools is that the neck portion of the leader must undergo deformation in order to be properly received between and properly held by the ribs. Still further, the ribs do not prevent radially outward movement of the wide end portion of the leader.

SUMMARY OF THE INVENTION

An object of the invention is to provide a novel and improved rotary spool or reel which is constructed and assembled in such a way that it allows for convenient attachment and insures safe retention of the leader of a strip of photographic film, magnetic tape or the like.

Another object of the invention is to provide a spool or reel which is constructed and configurated in such a way that the leader of a film or the like need not be deformed prior to and/or during attachment to the core.

A further object of the invention is to provide a spool or reel which can be used for storage of relatively long or short strips of photographic film, magnetic tape or the like, which can be constructed as a lightweight, one-piece body of metallic, synthetic plastic or other material, and which can be utilized as a superior substitute for presently known spools or reels which are employed as supply spools or takeup spools in or independently of cassettes for photographic film or magnetic tape in photographic cameras, projectors, tape recorders and like apparatus.

Still another object of the invention is to provide a spool or reel which allows for convenient attachment of the leader of a film or the like but positively and invariably prevents accidental separation of the attached leader.

The invention resides in the provision of a rotary spool or reel for storage of convoluted elongated flexible strips (e.g., photographic films or magnetic tapes) of the type having a leader including a relatively wide end portion and a relatively narrow second portion located behind the end portion and preferably having a length, as considered in the longitudinal direction of the strip, which exceeds the length of the end portion. The spool comprises a core having a preferably cylindrical external surface provided with a circumferentially extending groove including an elongated main or first section of a width at least equal to that of the second portion of a strip but less than the width of the end portion of such strip and a second section of a width at least equal to that of the end portion of a strip. The core is further provided with a pair of ribs or ledges flanking that part of the first groove section which is immediately adjacent to the second section and a pair of recesses which are overlapped by the ribs and communicate with the aforementioned part of the first groove section as well as with the second groove section. When the end portion of the leader of a strip is inserted into the second groove section while the second portion of such strip extends outwardly from the aforementioned part of the first groove section and the thus inserted end portion of the strip is moved in a direction toward the first groove section, the end portion is caused to enter into the recesses and is held by the ribs against separation from the core.

The novel features which are considered as characteristic of the invention are set forth in particular in the appended claims. The improved spool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
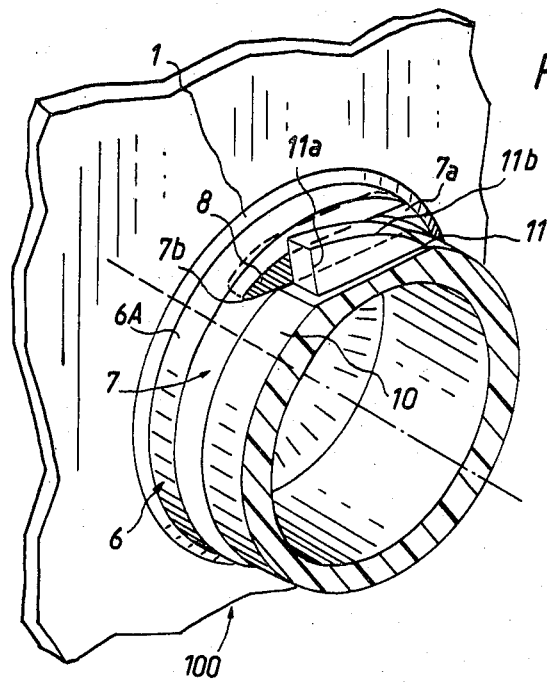
FIG. 2 is a smaller-scale perspective sectional view of the spool, the section being taken in the direction of arrows as seen from the line II—II of FIG. 1.

The improved spool or reel (hereinafter called spool) comprises a substantially cylindrical core 6 having a preferably cylindrical external surface 6A, and two flanges 1, 2 which are adjacent to the respective axial ends of the core 6 and extend radially outwardly beyond the external surface 6A. The illustrated spool is assumed to be used for storage of convoluted 8-millimeter motion picture film 5 having a leader including a relatively wide end portion 5b and a relatively narrow second portion or neck portion 5a which is located between the end portion 5b and the main portion 5c of the film 5. The width of the end portion 5b is shown as being slightly less than that of the main portion 5c. The length of the end portion 5b (as considered in the longitudinal direction of the film 5) is preferalby small, e.g., about one-third of its width. The length of the neck portion 5a is shown as being about twice its width and as being approximately equal to the width of the end portion 5b.

The illustrated spool further comprises two coupling portions 3 and 4 which are respectively adjacent to the flanges 1, 2 and serve to properly mount and/or to drive the spool in a motion picture camera or projector, not shown. In FIG. 2, the coupling portion 3 is attached to a complementary coupling portion of a cinematographic apparatus 100. The exact deatiles of the coupling portions 3, 4 form no part of the present invention. It is be be noted that the spool may be provided with a single flange, with two flanges 1, 2 (as shown) or without any flange.

Figure 1:
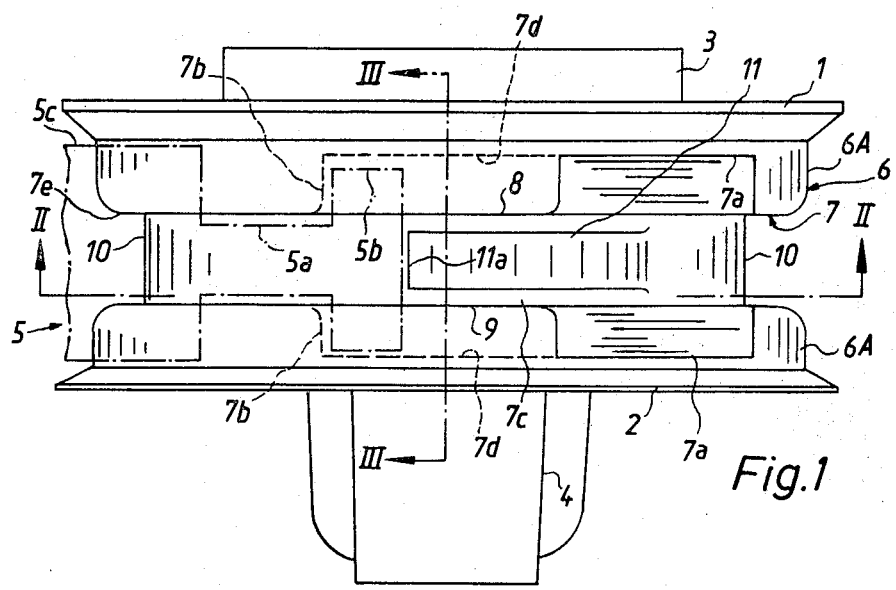
FIG. 1 is an elevational view of a spool which embodies the invention.

The surface 6A is provided with a circumferentially extending centrally located composite groove 7 including an elongated main section 7e having a width slightly exceeding the width of the neck portion 5a and a section 7a whose width slightly exceeds the width of the end portion 5b. Still further, the core 6 is provided with two arcuate ribs or ledges 8, 9 defining that part (7c) of the main groove section 7e which is immediately adjacent to and communicates with the relatively wide section 7a. The part 7c is preferably of constant width. The ribs 8, 9 overlie two recesses 7d which are provided in the core 6 so as to communicate at one end with the section 7a and also with the part 7c of the main groove section 7 e. The combined width of the two recesses 7d and part 7c (as considered in the axial direction of the core 6) preferably equals the width of the groove section 7a. Those ends (numbered 7b) of the recesses 7d which are remote from the section 7a as considered in the circumferential direction of the core 6, are bounded by axially and radially extending internal stop faces of the core 6. The overall length of the groove 7, as considered in the circumferential direction of the core 6, may be 360° (i.e., the groove 7 may be a circumferentially complete groove as shown in FIG. 2) or less. The length of the section 7a, as considered in the circumferential direction of the core 6, is preferably at least twice the length of the end portion 5b to thus allow for convenient introduction of the end portion 5b into the section 7a, and the length of the recesses 7d preferably exceeds the length of the end portion 5b and may but need not equal that of the section 7a. As shown in FIG. 1, the length of the recesses 7d is about three times the length of the end portion 5b. The distance between the ribs 8, 9 (i.e., the width of the part 7c) may but need not euqal the width of the main groove section 7e. The external surfaces of the ribs 8, 9 preferably form part of the cylindrical external surface 6A of the core 6. The bottom surface of the core 6 in the groove 7 is shown at 10.

Figure 3:
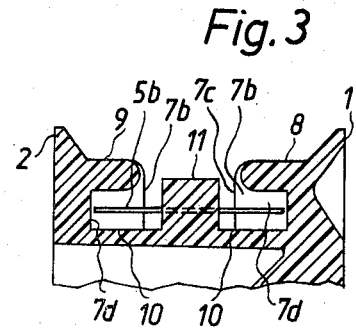
FIG. 3 is a sectional view as seen in the direction of arrows from the line III—III of FIG. 1.

The core 6 is further provided with a separable, permanently attached or integral projection 11 which extends outwardly from the bottom surface 10 between the ribs 8, 9 and has at its left-hand end, as viewed in FIG. 1, a radially extending stop face 11a spaced apart from the ends 7b of the recesses 7d by a distance which exceeds the length of the end portion 5b. The outer side of the projection 11 is a flat or convex surface 11b which slopes gradually from the bottom surface 10 toward the outermost portion of the stop face 11a and, as shown in FIGS. 3, has its radially outermost part at the general level of the internal surfaces of the ribs 8, 9. The width of the projection 11 is preferably at least slightly less than the width of the part 7c of the main groove section 7e.

The leader of the film 5 is attached to the core 6 as follows: The manipulator inserts the end portion 5b into the groove section 7a, preferably to the right of the projection 11, as viewed in FIG. 1, whereby the neck portion 5a extends into the part 7c of the main groove section 7e. The manipulator thereupon pulls the film 5 in a direction to the left (or rotates the core 6 in a direction to the right, as viewed in FIG. 1) so that the end portion 5b slides along the sloping guide surface 11b of the projection 11, under the ribs 8, 9 (i.e., into the recesses 7d) and ultimately assumes the position shown in FIG. 1 by phantom lines so that it is located to the left of the stop face 11a. This completes the attachment of the film 5 which is then prevented from being accidentally separated from the core 6 because its end portion 5b is confined between the ends 7b of the recesses 7d and the stop face 11a. To intentionally detach the leader of the film, the end portion 5b must be lifted radially outwardly of the core 6 beyond the outermost portion of the stop face 11a and thereupon pushed in a direction to the right, as viewed in FIG. 1, so as to reenter the groove section 7a. Such movement of the end portion 5b is extremely unlikely or plain impossible in the course of normal use of the spool. When the end portion 5b assumes the position shown in FIG. 1, the neck portion 5a extends outwardly through the main section 7e of the groove 7 and thus cannot interfere with the winding of the main film portion 5c onto the external surface 6A of the core 6 between the flanges 1 and 2. Thus, the innermost convolution of the main film portion 5c can lie flat against the surface 6A without any interference on the part of the neck portion 5a, ribs 8,9 and/or projection 11. The attachment of the leader of film 5 to the core 6 requires little skill and can be completed very rapidly. Furthermore, the neck portion 5a and/or the end portion 5b need not undergo any deformation during and/or subsequent to introduction of the end portion into the recesses 7d.

The projection 11 constitutes an optional but highly advantageous feature of the improved spool. It prevents accidental withdrawal of the end portion 5b from the recesses 7d when the pull upon the film 5 (in a direction to the left, as viewed in FIG. 1) slackens or when the end portion 5b is pushed in a direction away from the ends 7b of the recesses 7d. The sloping guide surface 11b facilitates the introduction of the end portion 5b into the recesses 7d.

One of the recesses 7d can be omitted if the end portion 5b of the leader of the film 5 extends laterally only beyond one side of the neck portion 5a. In such instances, the groove section 7a can be modified so that it extends only to one side of the main groove section 7a. The just described type of core can be used when the leader of the strip-shaped material is rather stiff and can stand substantial tensional and bending stresses.

It is further within the purview of the invention to provide the core with two pairs of ribs 8, 9 and to place the groove section 7a between the two pairs of ribs. Such a spool can be used for attachment of the leader of a film or the like from the right-hand side or from the left-hand side of the groove section 7a, as viewed in FIG. 1. The spool then preferably comprises two projections 11 one of which prevents removal of the end portion 5b from the illustrated recesses 7d and the other of which prevents removal of the end portion 5b when the latter is received in the recesses which are located inwardly of the other pair of ribs.

The illustrated core 6 is integral with the projection 11 and consists of synthetic plastic material.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A rotary spool for storage of convoluted flexible strips of the type having a leader including a relatively wide end portion and a relatively narrow second portion behind the end portion, comprising a core having an external surface provided with a circumferentially extending groove including a first section of a width at least equal to that of the second portion of a strip and a second section of a width at least equal to that of the end portion of a strip, said core further having two spaced apart ribs flanking a part of said first section immediately adjacent to said second section and two recesses each overlapped by a different one of said ribs and each communicating with said second section as well as with said part of said first section whereby, when the end portion of a strip is inserted into said second section while the second portion of such strip extends outwardly through said part of said first section and the thus inserted end portion is moved in a direction toward said first section, the end portion enters said recesses and is held by said ribs against separation from said core.

2. A spool as defined in claim 1, wherein said ribs have external surfaces forming part of said external surface of said core.

3. A spool as defined in claim 1, further comprising a projection provided in said part of said first section of said groove and having a stop face extending substantially transversely of said ribs, the distance between those ends of said recesses which are remote from said second section, as considered in the circumferential direction of said core, being at least equal to the length of the end portion of a strip as considered in the longitudinal direction of such strip.

4. A spool as defined in claim 3, wherein said core has a second surface constituting the bottom surface of said groove, said projection extending outwardly from said second surface and having a guide surface sloping outwardly from said second surface toward said stop face to guide the end portion of a strip from said second section toward and into said ends of said recesses whereby the end portion is held by said stop face against movement back toward said second section.

5. A spool as defined in claim 4, wherein said guide surface is a flat surface.

6. A spool as defined in claim 4, wherein said guide surface is a convex surface.

7. A spool as defined in claim 1, wherein the length of said second section of said groove and said recesses, as considered in the circumferential direction of said core, exceeds the length of the end portion of the leader of a strip as considered in the longitudinal direction of such strip.

8. A spool as defined in claim 1 further comprising at least one flange adjacent to one axial end of and extending radially beyond said core.

9. A spool as defined in claim 1, wherein said ribs have internal surfaces outwardly adjacent to the respective recesses and further comprising a projection provided in said groove in the region of said second section and said part of said first section and extending outwardly substantially to the level of said internal surfaces, said projection having a stop face extending substantially transversely of said ribs and substantially radially of said core, said recesses having ends remote from said second section and the distance between said ends of said recesses and said stop face being at least equal to the length of the end portion of a strip, as considered in the longitudinal direction of such strip.

10. A spool as defined in claim 9, wherein said projection is integral with said core and said core consists of synthetic plastic material.

* * * * *